United States Patent Office 3,753,971
Patented Aug. 21, 1973

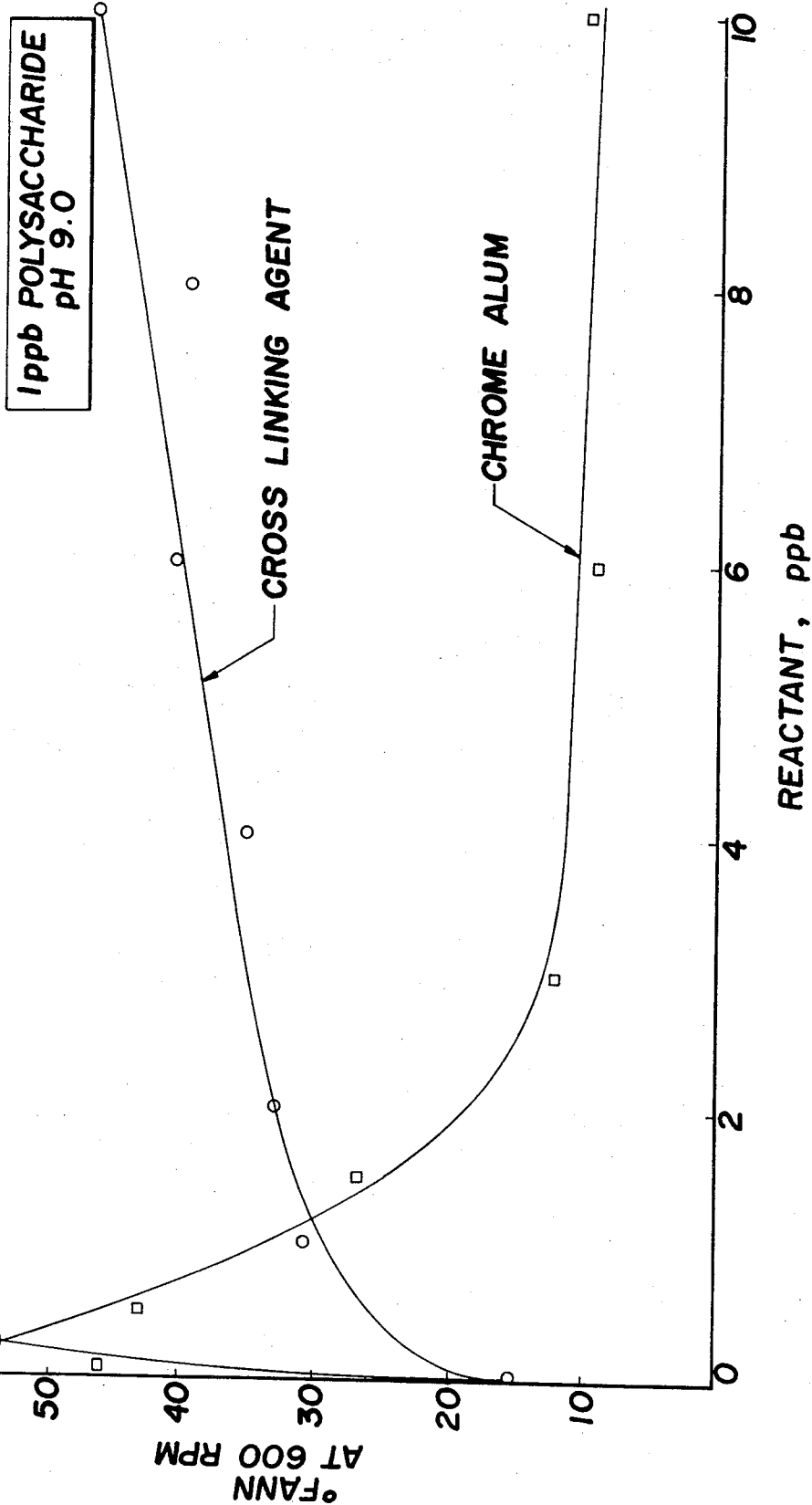

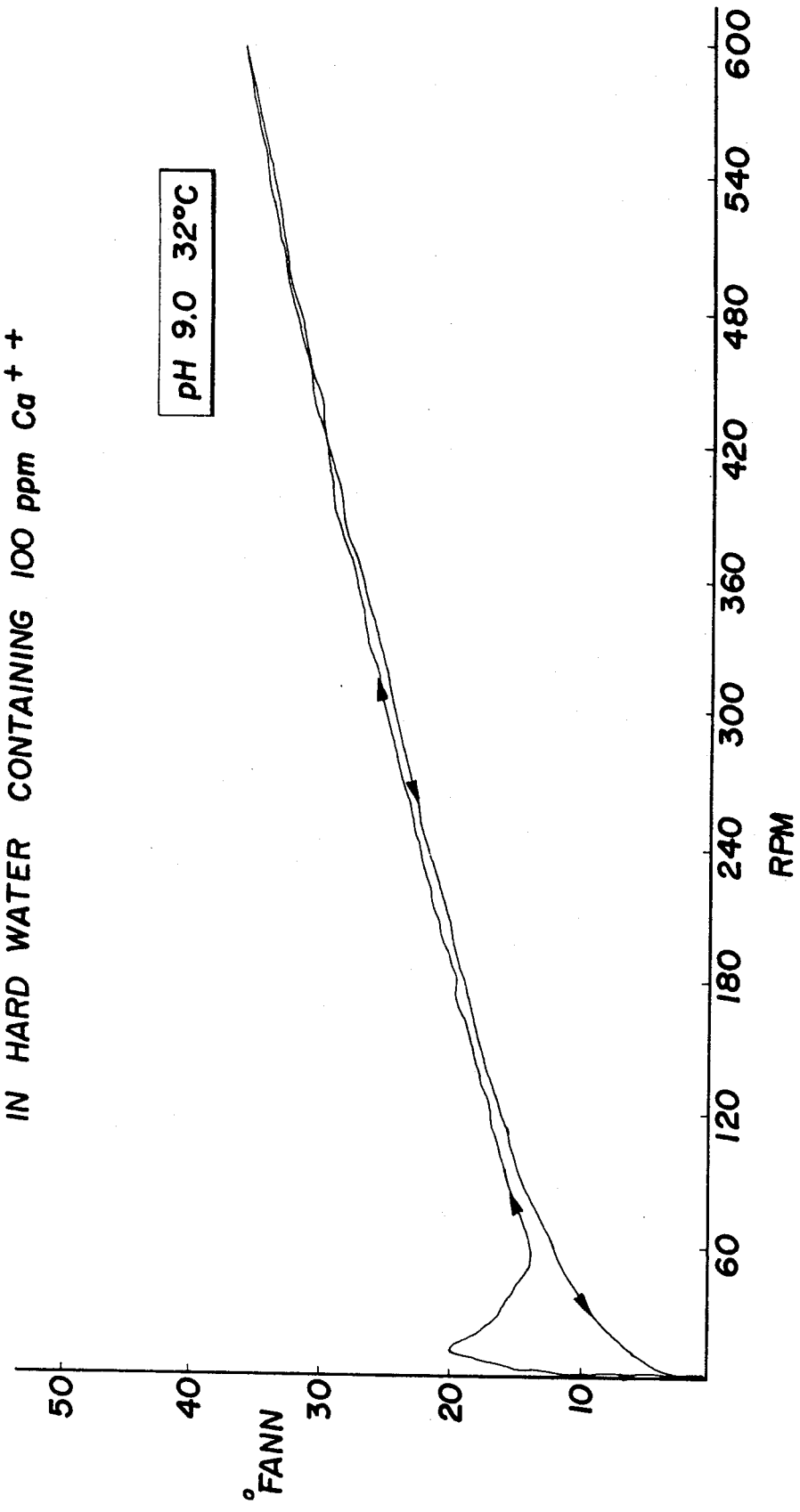
FIG. 5 RHEOGRAM OF 1ppb POLYSACCHARIDE SOLUTION CROSS LINKED WITH 6ppb OF CROSS LINKING AGENT IN HARD WATER CONTAINING 100 ppm $Ca^{++}$
pH 9.0 32°C

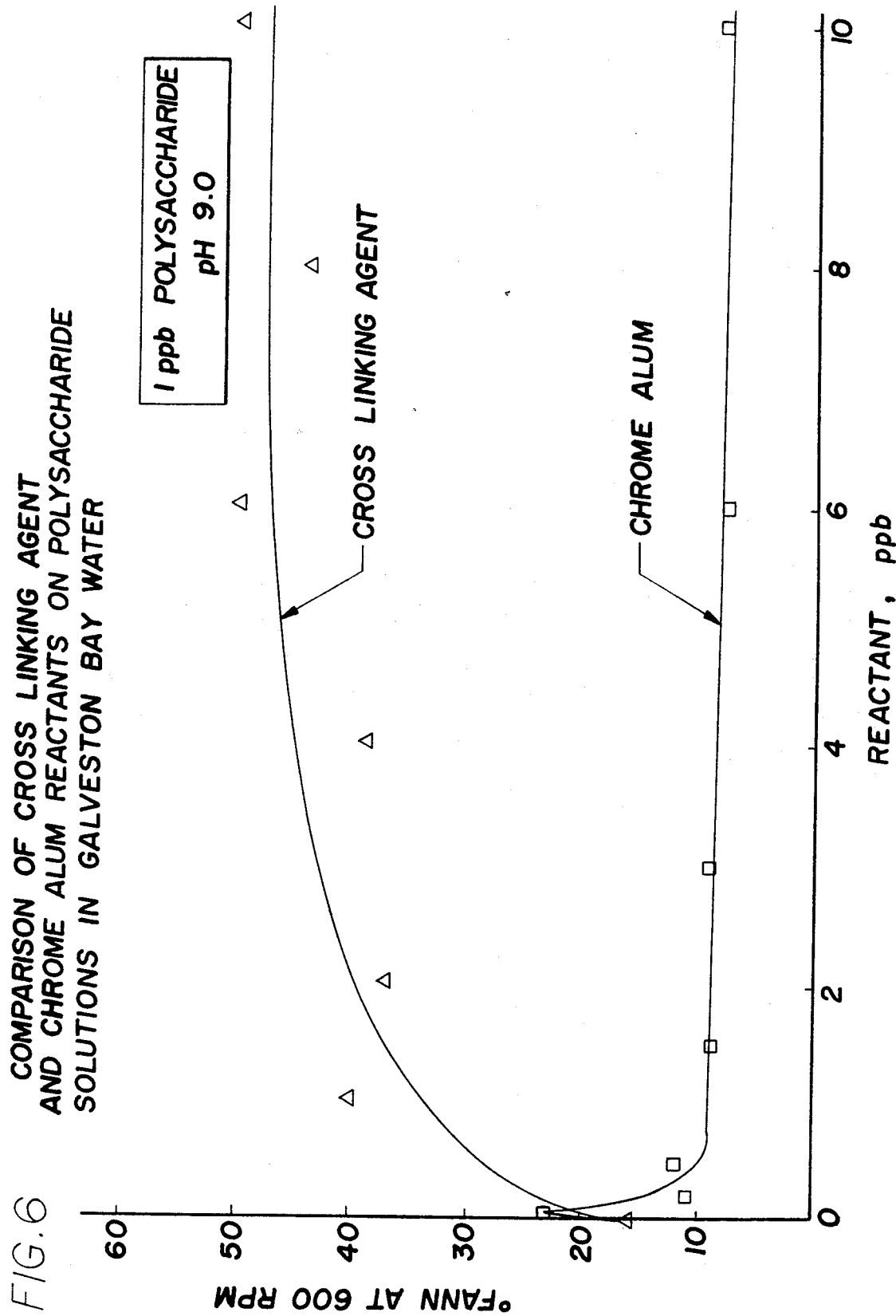

3,753,971
COMPOSITION AND PROCESS FOR CROSS-LINKING MACROMOLECULAR POLYSACCHARIDE SOLUTIONS
William C. Browning and Billy G. Chester, Houston, Tex., assignors to Milchem Incorporated, Houston, Tex.
Original application June 18, 1970, Ser. No. 47,325. Divided and this application Aug. 21, 1972, Ser. No. 282,375
Int. Cl. C07c 1/00
U.S. Cl. 260—124 R
4 Claims

ABSTRACT OF THE DISCLOSURE

A cross-linking agent for macromolecular polysaccharide materials consisting essentially of a chelating composition formed from (1) an organic polyelectrolyte ligand component, and (2) a component of a metal of the first series of the transition elements of the Periodic Table. This cross-linking agent has been found to provide enhanced rheological properties without obtaining metal ion overtreatment characteristics. In a preferred form, said cross-linking agent also includes a compound containing a metal from Group II of the Periodic Table. The cross-linked materials may be utilized in textile sizing agents, paints, drilling fluids, and the like.

CROSS REFERENCE TO RELATE APPLICATIONS

This is a division of application Ser. No. 47,325, filed June 18, 1970.

BACKGROUND OF THE INVENTION

(1) Field of the invention

This invention relates to a novel cross-linking agent for macromolecular polysaccharide materials. These materials are readily soluble in water and form enhanced shear rate thinning viscoelastic solutions when cross-linked with the cross-linking agent of the present invention. Solutions of these substances therefore characteristically exhibit a decrease in apparent viscosity as shear rate is increased and an increase in apparent viscosity as the rate of shear is decreased. These non-Newtonian solutions are generally temperature stable up to about 250° F., and are generally functional in solutions of inorganic electrolytes.

(2) Description of the prior art

In the past, those skilled in the art have relied heavily upon water soluble salts of polyvalent metal cations from Group III through Group VIII of the Periodic Table, such as chromium, to provide cross-linking of macromolecular polysaccharide materials in order to enhance their thixotropic, shear thinning characteristics. Chromic salt-containing compounds, such as chromium chloride, basic chromium sulfate, chromium aluminum sulfate, and the like have been particuraly utilized. However, the successful use of these materials alone has been somewhat limited because of a metal ion overtreatment effect on the macromolecular polysaccharide material. For example, chromium chloride and chrome alum have been found to overtreat the macromolecular polysaccharide material, i.e., when the cross-linking agent has been added in a concentration excess of about 0.5 p.p.b. (lb./bbl.), this lowering of apparent viscosity due to overtreatment will occur and will cause the solution to be "thinned" rather than "thickened." Therefore, increased levels of the usual metal salt cross-linking agent can produce an effect opposite of what was intended.

There is, therefore, industrial and commercial need of a material which will effectively cross-link macromolecular polysaccharide materials to provide a mechanically and chemically stable cross-linked macromolecular polysaccharide material not exhibiting this overtreatment effect. We have found that certain organic polyelectrolyte ligands may be reacted with certain compounds containing a metal from the first series of the transition elements of the Periodic Table to form a chelating composition which will act as cross-linking agents for certain macromolecular polysaccharide solutions. These organic chelates do not exhibit the overtreatment effect characteristic of inorganic metal salts of the elements present in Group III through Group VIII of the Periodic Table.

It is an object of the present invention to provide a new cross-linking agent for macromolecular polysaccharide materials used in aqueous solutions in which an organic polyelectrolyte is believed to act as the ligand for a transition element metal effective as a cross-linking agent.

It is also an object of the present invention to provide organic polyelectrolyte ligands to treat aqueous macromolecular polysaccharide solutions to produce a positive and controlled thickening effect, without any undesired overtreatment or "thinning" effects.

It is also an object of the present invention to prevent metal ion overtreatment of macromolecular polysaccharide materials resulting in a decrease in solution viscosity.

It is a further object of the present invention to provide a method of drilling subterranean wells utilizing the cross-linking of present invention.

Other objects and advantages of the use of the present invention will be readily appreciated from a reading of the description of the invention, the drawings, the examples, and the claims which follow.

BRIEF DESCRIPTION OF THE DRAWINGS

FIG. 4 is a graphical illustration of the non "overtreating" characteristic of the cross-linking agent of the present invention.

FIG. 5 is a rheogram showing the elimination of metal ion overtreatment effect on a macromolecular polysaccharide solution using 6 p.p.b. of the cross-linking agent of the present invention and 1 p.p.b. macromolecular polysaccharide material.

FIG. 6 is a graphical illustration of the room temperature apparent viscosity of macromolecular polysaccharide solutions cross-linked with the cross-linking agent of the present invention compared with the effect obtained by the use of chrome alum, in Galveston Bay water. The desirable controlled positive cross-linking obtained with our cross-linking agent is strikingly apparent.

SUMMARY OF THE INVENTION

Figure 1:
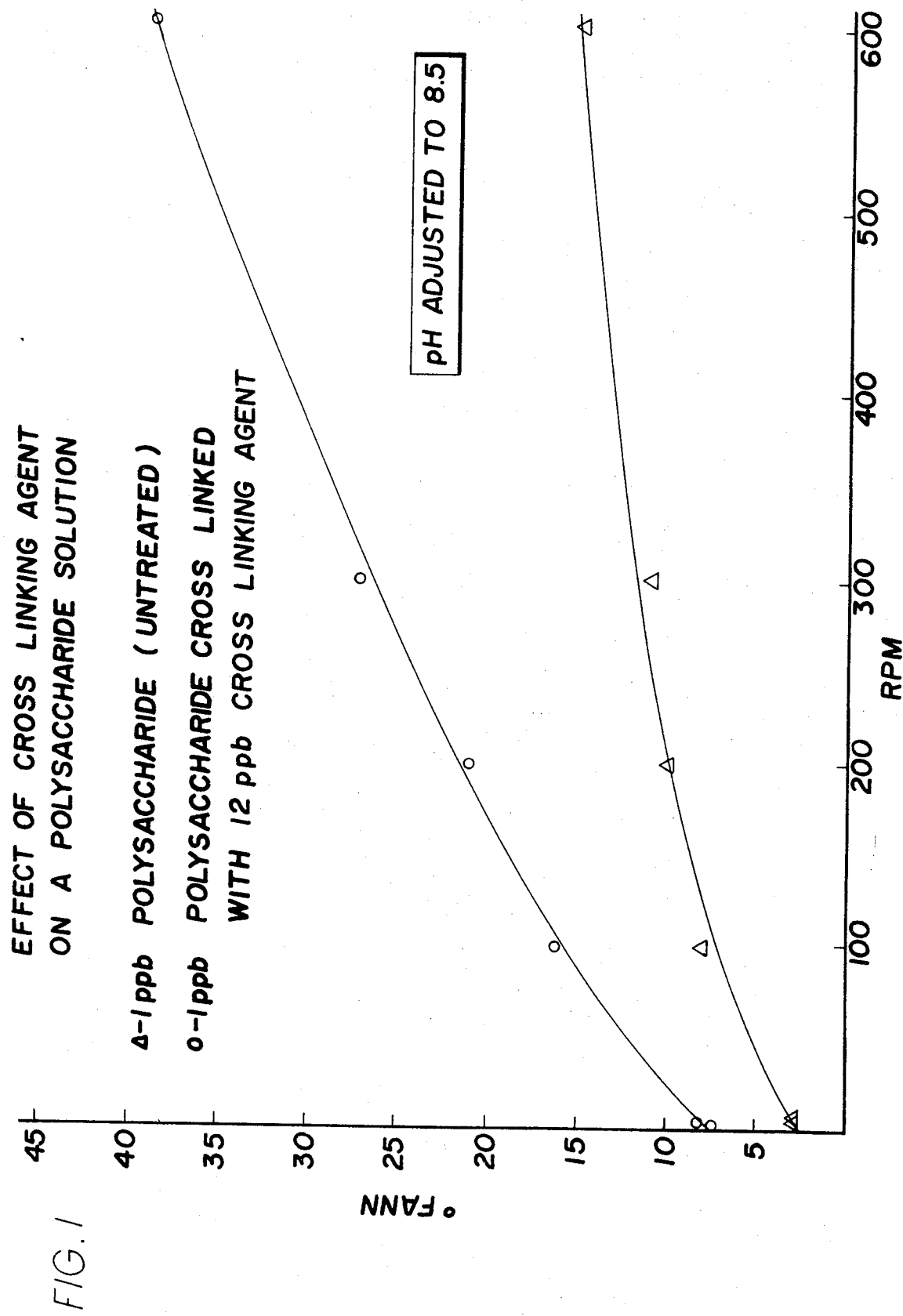
FIG. 1 is a graphical illustration comparing the room temperature viscosities of a solution of macromolecular polysaccharide sample cross-linked with the cross-linking agent of the present invention.

The present invention comprises a cross-linking agent for macromolecular polysaccharide materials consisting essentially of a chelating composition formed from (1) an organic polyelectrolyte ligand component and (2) a component of a metal of the first series of the transition elements of the Periodic Table. It is presently preferred that a compound containing a metal element from Group II of the Periodic Table be further incorporated in the composition of said cross-linking agent. The cross-linking agent may be utilized with macromolecular polysaccharide materials such as biologically polymerized glucose, corn starch, potato starch, soluble starches, chemically modified starch, and polysaccharides produced by the action of bacteria such as the genus Xanthomonas on carbohydrates.

DESCRIPTION OF THE PREFERRED EMBODIMENTS

When discussing macromolecular polysaccharide materials, we mean to refer to the use of polysaccharides or gums technically employed in industry. These organic materials are dispersible in either cold or hot water to produce viscous mixtures or solutions. Of particular interest are exudate gums, seaweed gums, seed gums, and starch and cellulose derivatives. Other macromolecular polysaccharides such as dextrins and dextrans derived from corn starch, potato starch, and other soluble starches as well as polysaccharide biopolymers produced by the action of bacteria on a carbohydrate may be utilized. Our cross-linking agent is particularly effective when utilized in conjunction with macromolecular polysaccharide materials produced by bacterial action of the genus Xanthomonas on carbohydrates. These bacteria may be of the species *Xanthomonas begoniae, Xanthomonas campestris, Xanthomonas carotae, Xanthomonas corylina, Xanthomonas gummisudans, Xanthomonas hederae, Xanthomonas incanae, Xanthomonas lespedezae, Xanthomonas malvacearum, Xanthomonas holcicola, Xanthomonas papavericola, Xanthomonas phaseoli, Xanthomonas pisi, Xanthomonas translucens, Xanthomonas vasculorum, Xanthomonas 'vesicatoria,* and the like. We have found our cross-linking agent to be particularly effective in treating the macromolecular polysaccharide material produced by the action of the bacteria Xanthomonas on a carbohydrate. This macromolecular polysaccharide material may be obtained by utilizing methods such as those disclosed in U.S. Pat. Nos. 3,000,790, 3,020,206, 3,228,855, 3,455,786, and 3,485,719.

Our cross-linking agent may be better defined as a chelating composition. The term chelate was originally proposed to designate those cyclic structures which arise from the union of metallic atoms with organic and inorganic molecules or ions. If a molecule is to function as a chelating agent, it must fulfill at least two conditions. First, it must possess two appropriate functional groups, the donor atoms of which are capable of combining with a metal atom by donating a pair of electrons. These electrons may be contributed by basic coordinating groups such as $NH_2$ or acidic groups that have lost a proton. Second, these functional groups must be so situated in the molecule that they permit the formation of a ring with the metal atom as the closing member. The donor group is termed a ligand and the metal atom the acceptor.

Chelates can only be formed by ligands that have more than one point of attachment to the metal. Therefore, a bidentate or polydentate ligand can form a chelate, but an unidentate ligand cannot form a chelate. Thus, for example, an unidentate sulfonic acid salt is not by definition a chelate.

Organic polyelectrolyte ligands containing reactive groups capable of forming metal chelates may be used as ligands in our cross-linking agent. For example, lignin-containing materials such as kraft lignin, soda lignin, polyphenolic tannins and polyflavonoids may function as suitable ligands. Lignosulfonates in which the sulfonic groups have been prereacted and saturated with sodium or ammonium ions are especially useful as ligands for the preparation of the cross-linking agent of this invention. Lignin-containing materials as used in the practice of this invention are readily available as by-products of chemical processes making chemical wood pulp or wood cellulose which are used to make paper and other products. The three processes generally used to chemically extract the cellulose from the wood, leaving the lignin from the wood in the waste liquor, are the soda process, the sulfate process, and the bisulfite or sulfite process. In general, any type of wood or lignocellulosic material which can be resolved into cellulose pulp by one of these three processes may be used as a source of lignin-containing materials for use in accordance with our discovery.

For reasons of economy, we prefer to utilize a sulfonated lignin-derived polymer which can be prepared by cooking wood chips with a sodium bisulfite or by adding sodium salts to calcium sulfite waste liquor in a manner calculated to cause a precipitation of the calcium ion and thereby forming the sodium salt of lignosulfonic acid. A sulfonate lignin-derived polymer derived from basic calcium lignosulfonate made in accordance with the procedures disclosed in patents such as U.S. Reissue Pat. Nos. 18,268 and 18,369 may be used. The calcium lignosulfonate is converted to the sodium salt by reaction of the sulfonic groups of the lignosulfonate with stoichiometric equivalent amounts of sodium salts, the anions of which will form water insoluble calcium salts, such as sodium phosphate, sodium fluoride, sodium oxalate, and sodium carbonate. Other metallic salts of lignosulfonates may also be used.

Although preferred, it is not essential in the preparation of the cross-linking agent of the present invention that sulfonated lignin-containing materials be used, for it has been found that practically any material containing reactive groups capable of forming metal chelates can be used to form the cross-linking agent of the present invention.

Moreover, natural tannin-containing polyelectrolytes such as Wattle extract or Quebracho may also be used as the ligand in the cross-linking agent of the present invention. Bark extracts derived by bisulfite cooking of hemlock, redwood, douglas fir, and similar barks, may also be used. The teachings of patents such as U.S. Pat. Nos. 2,890,231 and 2,938,893 or similar known processes may be used to obtain a satisfactory bark extract as the organic polyelectrolyte ligand component for use in our cross-linking agent.

When using a lignosulfonate as the ligand material, we prefer to utilize a lignosulfonate which is essentially free of wood sugars and hemicellulose. For example, when reacting spent sulfite liquor with materials such as sulfuric acid and sodium sulfate in a water solvent system to provide sodium lignosulfonate, it is desirable to destroy the residual sugar content with ammonia gas, heat, or other additives or processes known to those skilled in the art.

In order to achieve enhanced characteristics the lignin polyelectrolyte ligand material should be polymerized to such a degree that the resulting product in an aqueous solution has a viscosity of about 80 centipoises at 30° C. with 36% by weight solids. Polymerization may be practiced by any suitable effective method known to those skilled in the art. However, we have found that excellent lignin polymer characteristics may be obtained by utilizing formaldehyde condensation polymerization techniques.

Our cross-linking agent also contains a compound containing a metal from the first series of the transition elements. The transition elements may be defined as those elements which have partly filled $d$ or $f$ shells in any of their commonly occurring oxidation states. The first series transition elements includes scandium, titanium, vanadium, manganese, iron, cobalt, chromium, nickel, and copper.

When chromium has been selected as the metal component from the first series of transition elements, our tests have indicated that not all chromium salts react suitably with the organic polyelectrolyte ligand component. We have found that it is essential that the chromium not be introduced in the organic polyelectrolyte ligand component by an oxidation reaction as by reacting with chromates or dichromates, for this causes the chromium to be covalently bonded in the organic molecule in such a manner as to render the chromium unavilable for base exchange or for cross-linking reactions. We have further found that there are even great differences in, for example, nominal chrome sulfates and that, when using a chrome sulfate, it is imperative that chrome sulfates having specific properties be utilized. We have found, when selecting chrome in the form of chrome sulfate as the transition metal components, that a chrome sulfate compound having properties within the following ranges will be effective in producing the cross-linking agent of the present invention without metal ion overtreatment effects:

| Properties: | Effective range |
|---|---|
| Basicity, degrees Schlorlemmer | 33⅓ to 0 |
| pH, solution | 2.3 or less |
| Total chrome, wt. percent solution basis | 12.5 to 11.8 |
| Total sodium, wt. percent solution basis | 6.0 to 5.0 |
| Total sulfate sulfur, wt. percent solution basis | 16.0 to 15.0 |
| Total solids, wt. percent solution basis | 66 to 60.0 |

We prefer to utilize a chrome sulfate product with the following properties:

| Properties: | Effective range |
|---|---|
| Basicity, degrees Schlorlemmer | 33⅓ |
| pH, solution, equal to or less than | 2.0 |
| Total chrome, wt. percent solution basis | 12.1 |
| Total sodium, wt. percent solution basis | 5.8 |
| Total sulfate sulfur, wt. percent solution basis | 15.2 |
| Total solids, wt. percent solution basis | 65.0 |

Assuming that the chrome sulfate is prepared by the reduction of sodium dichromate by a reducing agent in a sulfuric acid solution, the basicity of the resulting chromium sulfate compound may be determined as follows:

$$1.33 - \frac{\text{wt. } H_2SO_4}{\text{wt. } Na_2Cr_2O_7 \cdot 2\ H_2O} = 1.33 - \frac{\text{wt. } H_2SO_4}{\text{wt. } K_2Cr_2O_7}$$

When using chrome sulfate in obtaining the cross-linking agent of the present invention it is imperative that the basicity of the chrome sulfate be one-third or less and that a chrome sulfate having the above described properties be used. Stating that a "basic" chrome sulfate may be utilized is not definitive enough to determine the particular chrome material that must be used in accordance with the invention.

Although not fully understood, it is believed that the effective cross-linking of the macromolecular polysaccharide material with the agent of the present invention is obtained due to the ability of certain organic polyelectrolyte ligands to form chelates of controlled stability coefficient with a component containing a metal of the first series of the transition elements of the Periodic Table, such as chromium. For example, chromium chelates make the metal available for the cross-linking of the hydroxyl groups of the macromolecular polysaccharide material in a controlled or "buffered" manner that prevents chromium ion overtreatment effects and minimizes other undesirable side reactions of the chromium ions that may occur through dissociation of ordinary chrome sulfates, chlorides or alums.

We have found that the effectiveness of the cross-linking action of our chelate composition with macromolecular polysaccharide materials is enhanced by the addition into the organic polyelectrolyte ligand of a compound containing an element from Group II of the Periodic Table. For example, the incorporation of magnesium into the organic polyelectrolyte ligand component greatly increases the commercial utility of the compound by increasing its effectiveness in a variety of natural waters. When selecting magnesium, we have found that about 3.5% by weight, dry solids basis, to the entire composition, is a sufficient amount under normal circumstances to produce effective cross-linking. We have also found that this material may be effectively introduced in the reaction process as magnesium chloride. When utilizing magnesium chloride we prefer to add about 13.72% by weight on an anhydrous basis based on the weight of the entire composition.

When reacting chrome sulfate as above described with the organic polyelectrolyte ligand, we prefer to use about 5.7% chromium by weight of the entire cross-linking agent composition, although the chromium content may be as low as 4.0% and as high as 10.0%. The chrome sulfate is added to the solution in a reaction vessel and agitation is initiated and continued for at least 30 minutes in order to assure complete reaction. The resulting material may be utilized in liquid, or spray dried and used in powder form.

The actual cross-linking of the macromolecular polysaccharide material with the cross-linking agent of the present invention may be effected in one of several ways which will provide a solution with enhanced rheological characteristics. For example, when utilizing the macromolecular polysaccharide material in an aqueous drilling fluid, the macromolecular polysaccharide material and the cross-linking agent of the present invention may be added simultaneously to the water circulating in the well. Preferably, the macromolecular polysaccharide material is dispersed and circulated in the water solution followed by the addition of the cross-linking agent of the present invention. Cross-linking of the macromolecular polysaccharide material may also take place in a convenient mixing tank adjacent to the well site.

The amount of cross-linking agent of this invention which may be utilized with the macromolecular polysaccharide material is not critical and will vary depending upon the particular application at hand. Any amount sufficient to produce cross-linking may be added. We have found that metal ion overtreatment characteristics will not result when using our cross-linking agent in cross-linking agent-to-polysaccharide ratios as low as 1-to-1 and as high as 24-to-1. When using a cross-linked macromolecular polysaccharide solution in an aqueous drilling fluid, a 4-to-1 polysaccharide-to-cross-linking agent ratio should be sufficient to produce the desired controlled rheological properties. It is important to note that these solutions are distinct due to the fact that no bentonite or similar agent is added or desired for the system to function effectively.

After the addition of the cross-linking agent, the pH of the solution should be adjusted to a range between about 6 and about 7 with sodium hydroxide or a similar chemical. We have found that a pH adjustment to about 7 is quite satisfactory. The solution should be mechanically stirred in order to prevent a localized high pH condition. After initial mixing, the pH of the aqueous solution may be adjusted up to about 11.0.

In order to prevent biodegradation, a common occurrence in macromolecular polysaccharide materials, a biocide or biodegradation preventative such as "Dowcide G," manufacturded by The Dow Chemical Co., should be adder shortly after initial pH adjustment. Other known additives, such as paraformaldehyde, may also be used. We prefer to add about 0.1 p.p.b. to 0.5 p.p.b. of this chemical dissolved in water to the cross-linked polysaccharide solution.

The cross-linked macromolecular polysaccharide solutions are valuable for a diversity of industrial uses, e.g., textile printing pastes, latex dispersions, coating materials, as a protective colloid for pre-emulsions, and as a textile sizing and finishing agent. They have also been found to be an important constituent of aqueous drilling fluids.

The invention is further described and illustrated by the examples that follow. The chrome alum utilized throughout the examples and in the attached figures has the formula $Cr_2(SO_4)3K_2SO_4 \cdot 24H_2O$. This material is available as Baker and Adamson chromium potassium sulfate and is manufactured by Allied Chemical Co., General Chemical Division, Morristown. N.J. This material is readily available to the general public.

The macromolecular polysaccharide material, also referred to as simply "polysaccharide," utilized in the examples and figures is the product of the fermentation reaction of the bacteria *Xanthomonas campestris* on carbohydrates. This material is commercially available as "Kelzan XC Polymer," made by Kelco Corporation of San Diego, Calif.

EXAMPLE I

The present example demonstrates a preferred process for obtaining the cross-linking agent of the present invention. Thirteen thousand five hundred (13,500) kg. of sodium lignosulfonate liquor of about 38% solids having present no more than about 7% sugar content is pumped to a drum reactor. The pH of the sodium lignosulfonate liquor is adjusted by pumping 25% ammonium hydroxide to the reactor. Three hundred (300) kg. of this chemical is added below the surface of the sodium lignosulfonate liquor to obtain a pH of about 7.5 and to adequately destroy the sugar content of the sodium lignosulfonate. After pH adjustment, the temperature of the reactor is raised to about 130° C. This process is continued for about 120 minutes.

Polymerization is initiated by injecting a solution of 2% formaldehyde in the circulation line while circulating the liquor. Upon the conclusion of formaldehyde injection, the temperature of the reaction mixture is maintained at 130° C. for an additional 45 minutes. The reactants are then cooled down to 70–80° C.

A 33% solution of magnesium chloride (340 liters) is slowly added to five hundred fifty-one (551) kg. of the desugared and polymerized sodium lignosulfonate solution. Two hundred seventy (270) liters of the preferred chrome sufate solution is slowly injected into the liquor circulation line. After the complete addition of the preferred chrome sulfate with the lignosulfonate, the mixture is agitated for about 30 minutes to insure complete reaction. The cross-linking agent is then spray dried.

EXAMPLE II

The present example demonstrates the ability of the cross-linking agent of the present invention to effectively crosslink macromolecular polysaccharide materials.

A sample of a solution of the cross-linking agent prepared as in Example I was cross-linked with a macromolecular polysaccharide material and was compared with an untreated sample of the macromolecular polysaccharide material. The cross-linking agent was utilized with the macromolecular polysaccharide material in a ratio of 12 lb./bbl. of cross-linking agent to one lb./bbl. macromolecular polysaccharide material. The untreated sample containing only the macromolecular polysaccharide material was prepared at the one lb./bbl. level. The water utilized was treated to simulate natural water in that all samples were contaminated with 100 p.p.m. calcium ion. The pH was then adjusted to 8.5 with sodium hydroxide after cross-linking. Viscosity data was determined at room temperature by utilizing a Model 35 Fann Viscometer, a common instrument for measuring rheological properties of liquids, widely accepted by many industries where rheological data is relevant. Fann viscometers are of the concentric cylinder type where the test fluid is contained in an annular space between cylinders. Rotation of the outer cylinder at known velocities is accomplished through precision gearing causing a torque to be transmitted to the inner cylinder by the viscous drag of the fluid. This torque is balanced by a helical spring, and angular deflection is read from a dial or through suitable sensors on a meter or recorder. The amount of torque at a given r.p.m. is indicated in arbitrary degrees Fann, which may be converted into viscosity or apparent viscosity by appropriate calculation. The apparent viscosity of non-Newtonian fluids or viscosity of Newtonian fluids may be obtained from the Fann reading as follows:

Approximate apparent viscosity of:

(1) Degrees Fann at 600 r.p.m.×½=viscosity in centipoises
(2) Degrees Fann at 300 r.p.m.×1=viscosity in centipoises
(3) Degrees Fann at 200 r.p.m.×1½=viscosity in centipoises
(4) Degrees Fann at 100 r.p.m.×3=viscosity in centipoises
(5) Degrees Fann at 6 r.p.m.×39=viscosity in centipoises
(6) Degrees Fann at 3 r.p.m.×98=viscosity in centipoises The results of these tests, shown in FIG. 1, indicated that the cross-linking agent of the present invention effectively cross-linked with the macromolecular polysaccharide material to produce a shear rate thinning solution. The table below further indicates the results of these tests.

TABLE 2

|  | Untreated polysaccharide material [1] | | Cross-linking agent [1] | |
|---|---|---|---|---|
|  | ° Fann | Apparent viscosity, cps. | ° Fann | Apparent viscosity, cps |
| R.p.m.: | | | | |
| 600 | 15.0 | 7.5 | 39.0 | 19.5 |
| 300 | 11.0 | 11.0 | 27.0 | 27.0 |
| 200 | 10.0 | 15.0 | 21.0 | 31.5 |
| 100 | 8.0 | 24.0 | 16.0 | 48.0 |
| 6 | 3.0 | 147.0 | 8.0 | 392.0 |
| 3 | 3.0 | 294.0 | 7.0 | 616.0 |
| Initial gel, lb./100 sq. ft | 3.0 | | 11.0 | |
| pH | 9.5 | | 8.8 | |
| NaOH used to adjust pH, cc | 0.1 | | 4.8 | |

[1] All tests determined at room temperature.

EXAMPLE III

Figure 2:
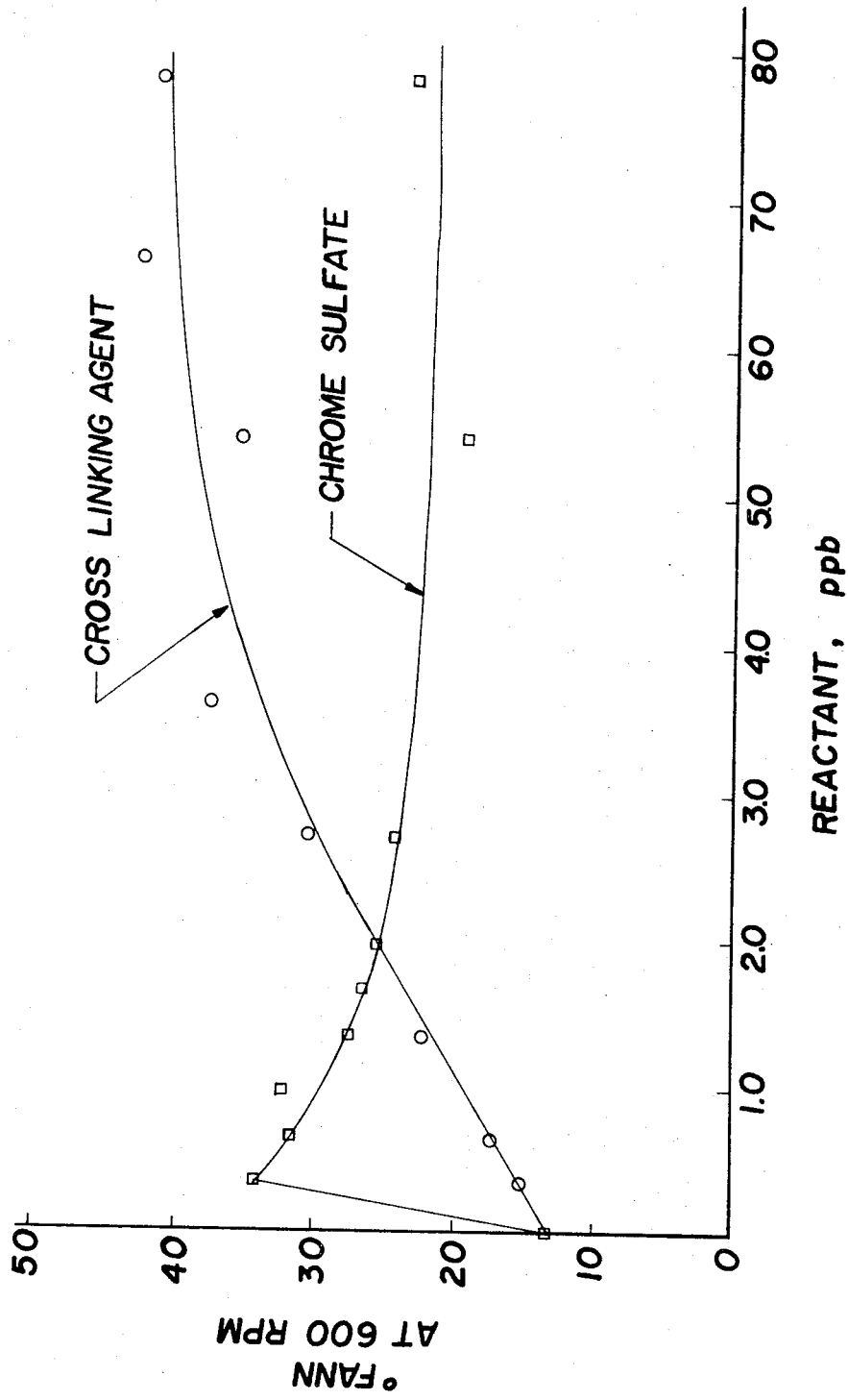
FIG. 2 is a graphical illustration comparing room temperature viscosities of a solution of a macromolecular polysaccharide material cross-linked with a one-third basicity chrome sulfate and a duplicate macromolecular polysaccharide sample cross-linked with the cross-linking agent of the present invention.

Tests were run in order to compare results of cross-linking macromolecular polysaccharide materials with a chrome sulfate having above described properties with and without the cross-linking agent of the present invention, respectively. Gypsum was added to ordinary Houston, Tex., tap water to obtain the equivalent of 100 p.p.m. calcium ion content. One p.p.b. equivalent of the macromolecular polysaccharide material was added to 350 ml. of the water and blended by mechanical agitation. The chrome sulfate and the cross-linking agent of the present invention made as in Example I were then added to the respective samples. Various p.p.b. levels of cross-linking agents were utilized. The pH of the solutions was adjusted to 8.5 with sodium hydroxide in order to obtain maximum cross-linking. The samples were allowed to age overnight before rheological data was obtained using the Fann Viscometer as previously described. FIG. 2 graphically depicts the results of this test.

As can be seen in the table below, the cross-linking agent of the present invention provided a more stable thickening agent with increased thickening characteristics as increased p.p.b. levels of the agent were utilized. It will also be seen that the problem of overtreatment has been drastically reduced through the use of the cross-linking agent of the present invention.

TABLE 3-A

| | Chrome sulfate, p.p.b. | | | | | | | | | | | | | |
|---|---|---|---|---|---|---|---|---|---|---|---|---|---|---|
| | 0.28 | | 0.56 | | 0.84 | | 1.12 | | 1.41 | | 1.69 | | 2.43 | |
| | °Fann | Apparent viscosity | °Fann | Apparent viscosity | °Fann | Apparent viscosity | °Fann | Apparent viscosity | °Fann | Apparent viscosity | °Fann | Apparent viscosity | °Fann | Apparent viscosity |
| R.p.m.: | | | | | | | | | | | | | | |
| 600 | 34 | 17.0 | 31 | 15.5 | 32 | 16.0 | 27 | 13.5 | 26 | 13.0 | 25 | 12.5 | 24 | 12.0 |
| 300 | 23 | 23.0 | 22 | 22.0 | 18 | 18.0 | 17 | 17.0 | 19 | 19.0 | 16 | 16.0 | 17 | 27.0 |
| 200 | 19 | 28.5 | 16 | 24.0 | 14 | 21.0 | 13 | 19.5 | 12 | 18.0 | 13 | 19.5 | 13 | 19.5 |
| 100 | 14 | 52.0 | 12 | 36.0 | 10 | 30.0 | 8 | 24.0 | 7 | 21.0 | 9 | 27.0 | 9 | 27.0 |
| 6 | 5 | 245.0 | 5 | 245.0 | 8 | 392.0 | 4 | 196.0 | 3 | 147.0 | 3 | 147.0 | 2.5 | 122.5 |
| 3 | 5 | 490.0 | 5 | 490.0 | 8 | 784.0 | 4 | 392.0 | 3 | 294.0 | 3 | 294.0 | 2 | 196.0 |
| Initial gel, lb./100 sq. ft. | 5 | | 5 | | 12 | | 14 | | 4 | | 4 | | 2 | |
| pH | 11.4 | | 8.5 | | 8.4 | | 8.5 | | 8.6 | | 8.8 | | 8.8 | |
| Amount sodium hydroxide added to adjust pH, cc | 1.0 | | 0.45 | | 0.65 | | 1.0 | | 1.5 | | 1.3 | | 2.0 | |

TABLE 3-B

| | Cross-linking agent, p.p.b. | | | | | | | | | | | | | |
|---|---|---|---|---|---|---|---|---|---|---|---|---|---|---|
| | 0.73 | | 1.46 | | 2.92 | | 4.37 | | 6.00 | | 8.00 | | 12.00 | |
| | °Fann | Apparent viscosity | °Fann | Apparent viscosity | °Fann | Apparent viscosity | °Fann | Apparent viscosity | °Fann | Apparent viscosity | °Fann | Apparent viscosity | °Fann | Apparent viscosity |
| R.p.m.: | | | | | | | | | | | | | | |
| 600 | 15 | 7.5 | 17 | 8.5 | 22 | 11 | 18 | 9 | 30 | 15 | 37 | 18.5 | 35 | 17.5 |
| 300 | 12 | 12 | 13 | 13 | 17 | 17 | 13 | 13 | 27 | 27 | 27 | 27 | 25 | 25 |
| 200 | 9 | 13.5 | 11 | 16.5 | 14 | 21 | 11 | 16.5 | 17 | 25.5 | 23 | 34.5 | 21 | 31.5 |
| 100 | 7 | 21 | 9 | 27 | 12 | 36 | 9 | 27 | 15 | 45 | 18 | 54 | 17 | 51 |
| 6 | 3 | 147 | 4 | 196 | 5 | 245 | 3.5 | 171.5 | 8 | 392 | 9 | 441 | 9 | 441 |
| 3 | 2 | 196 | 3 | 294 | 4 | 392 | 3 | 294 | 8 | 784 | 8 | 784 | 7 | 686 |
| Initial gel, lb./100 sq. ft. | 3 | | 3 | | 5 | | 4 | | 10 | | 13.2 | | 13 | |
| pH | 8.6 | | 8.5 | | 8.6 | | 8.9 | | 8.6 | | 8.6 | | 8.7 | |
| Amount sodium hydroxide added to adjust pH, cc | 0.25 | | 0.60 | | 1.0 | | 1.8 | | 2.5 | | 2.6 | | 3.8 | |

EXAMPLE IV

Figure 3:
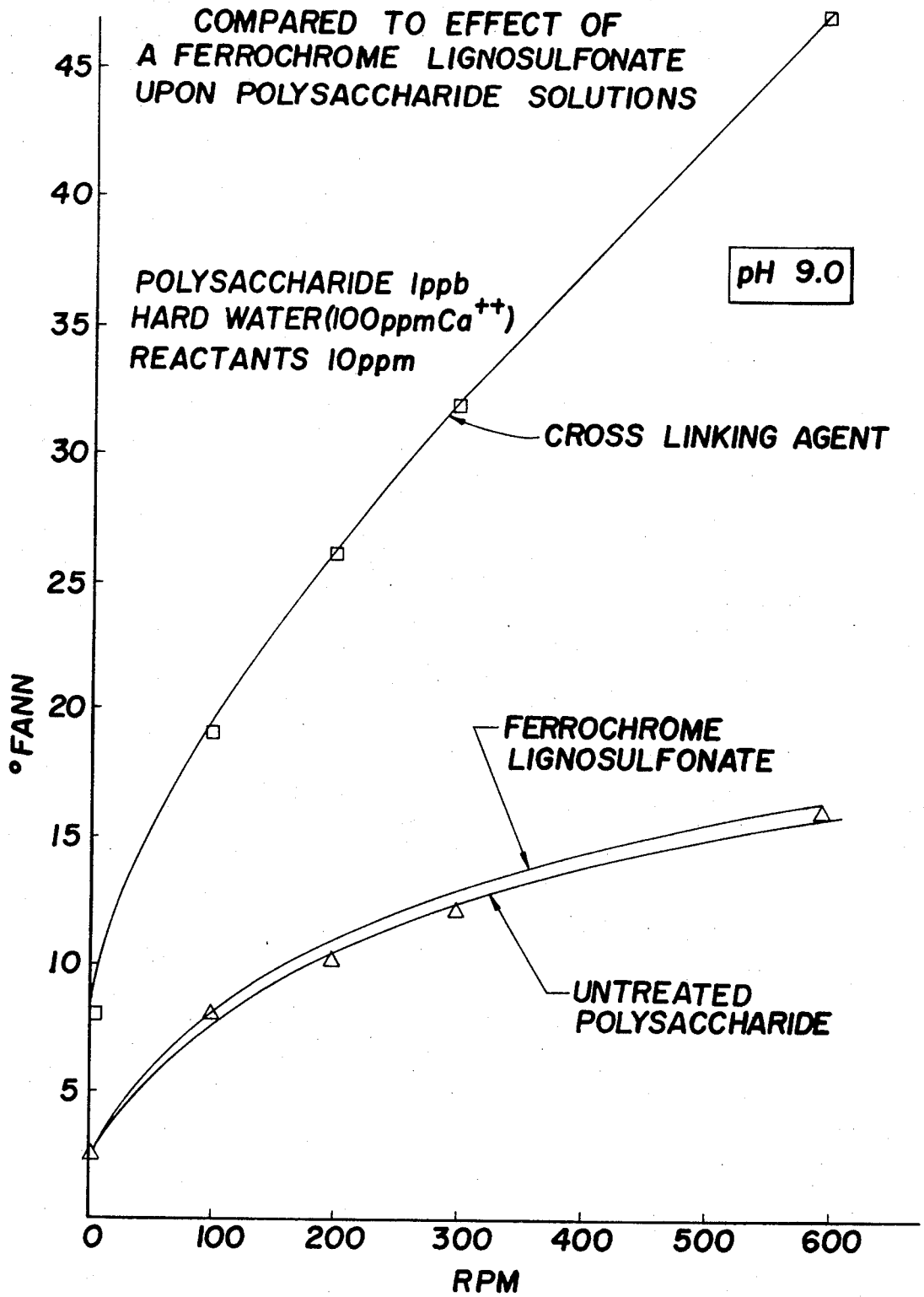
FIG. 3 is a rheogram comparing the room temperature viscosities of a 1 p.p.b. solution of a macromolecular polysaccharide material cross-linked with the cross-linking agent of the present invention and a ferrochrome lignosulfonate compound, respectively.

Cross-linking effects of a ferrochrome lignosulfonate material were compared with those of the cross-linking agent of the present invention as made in Example I. The ferrochrome lignosulfonate material is commercially available as "Spersene," manufactured by Dresser Industries, and patented under U.S. Pat. No. 2,935,473. One p.p.m. of the polysaccharide material was utilized in each test sample. Three hundred and fifty (350) ml. of hard water containing 100 p.p.m. calcium ion was utilized. The macromolecular polysaccharide material was added to each water sample and blended by mechanical agitation. Into one sample was placed 10 p.p.b. of the cross-linking agent of the present invention. Into the remaining sample was placed 10 p.p.b. "Spersene." The pH of each sample was adjusted to 9.0 by addition of sufficient quantities of sodium hydroxide. Fann readings were taken at 25° C. FIG. 3 shows the results of these tests. As can be readily seen, there was a considerable enhancement of thixotropy by utilization of the cross-linking agent of the present invention. The tables below further illustrate the results of these tests. It should be emphasized that for economic reasons it is highly desirable to obtain the highest apparent viscosity possible by a given amount of shear rate thinning properties.

TABLE 4-A—Cross-Linking Agent

| R.p.m. | 0 | 100 | 200 | 300 | 600 |
|---|---|---|---|---|---|
| °Fann | | 7.6 | 18 | 27 | 34 | 49 |
| A/V [1] | | | 54 | 40.5 | 34 | 24.5 |

[1] Apparent viscosity, centipoises.

TABLE 4-B—"Spersene"

| R.p.m. | 0 | 100 | 200 | 300 | 600 |
|---|---|---|---|---|---|
| °Fann | 2 | 7.5 | 11 | 13 | 16 |
| A/V [1] | | 22.5 | 16.5 | 13 | 8 |

[1] Apparent viscosity, centipoises.

EXAMPLE V

Tests were run and results evalauted in order to determine the ability of the cross-linking agent of the present invention to prevent chromium ion overtreatment of macromolecular polysaccharde materials. The tests were conducted in hard water contaminated with 100 p.p.m. calcium ion. One p.p.b. of the polysaccharide material was utilized with p.p.b. levels from 0 to 10 of a basic chrome-containing, cross-linking compound, chrome alum, and the cross-linking agent of the present invention made according to Example I, respectively. The pH of the solutions was raised with sodium hydroxide to 9.0. The Fann Viscometer, as described above, was again utilized to obtain rheological data. The Fann readings were taken at the 600 r.p.m. level at room temperature. FIG. 4 illustrates the results of this test. As can be seen, the cross-linking agent of the present invention produced a thinning of the polysaccharide material after a peak in thickening at the 1 p.p.b. level. This characteristic is called "overtreatment" and, as can also be seen, was completely eliminated by the use of the cross-linking agent of the present invention. The results of this test are described in detail in the following table.

TABLE 5

Cross-linking Agent

| P.p.b.: | °Fann at 600 r.p.m. |
|---|---|
| 0 | 15 |
| 1 | 30 |
| 2 | 34 |
| 4 | 35 |
| 6 | 40 |
| 8 | 40 |
| 10 | 47 |

Chrome alum

| | |
|---|---|
| 0 | 15 |
| 1 | 46 |
| 2 | 19 |
| 4 | 11 |
| 6 | 9 |
| 8 | 9 |
| 10 | 9 |

EXAMPLE VI

Tests were run and results were evaluated to determine cross-linking characteristics of the cross-linking agent made as in Example I compared with those of a chromium-containing compound commercially available as chrome alum. The tests were run in Galveston Bay water in order to simulate a difficult environment in which to cross-link macromolecular polysaccharide materials. An analysis of the Galveston Bay water indicated the following contents:

|  | Mg./ml. |
|---|---|
| Calcium content | 0.170 |
| Magnesium content | 0.460 |
| Sodium content | 3.8 |
| Sulfate content | 9.83 |
| Chloride content | 6.8 |
| Specific gravity | 1.009 |
| pH 7.4. | |

The test samples were prepared by adding to 350 ml. samples of the water one p.p.b. equivalent of the macromolecular polysaccharide material. Blending was achieved by mechanical agitation. The samples were then treated with 0, 1, 2, 4, 6, 8 and 10 p.p.b., respectively, of the cross-linking agent of the present invention, made as in Example I. Other samples of the macromolecular polysaccharide material were treated with chrome alum at 0.10, 0.25, 0.50, 1.50, 3.00, 6.00 and 10.00 p.p.b levels, respectively, and also blended by mechanical agitation. The pH of all samples was then raised to 9.0 with sodium hydroxide. All samples were allowed to cool to room temperatures before Fann readings were initiated.

Table 6-A below contains the results of tests using the chrome alum compound while Table 6-B below illustrates the results obtained with the cross-linking agent of the present invention. It is of special interest to note that chrome alum gave poor results at all concentrations evaluated. Maximum cross-linking was obtained with 0.10 p.p.b. of the chrome alum sample.

EXAMPLE VII

Tests were run, as in Example VI above, except that a brine system replaced the Galveston Bay seawater. Brines are often encountered in the actual drilling of oil and gas wells and are a difficult environment in which to cross-link a macromolecular polysaccharide material and to control drilling fluid rheology.

The synthetic brine samples were prepared by dissolving 82 grams of $CaCl_2 \cdot 2H_2O$ in 350 ml. of deionized water. Reagent grade calcium chloride was utilized. Samples, as made in Example VI above, were again prepared and evaluated. Tables 7-A and 7-B illustrate the results of this test. It should be noted that only at the 0.10 p.p.b. concentration did chrome alum obtain a satisfactory cross-linking effect.

TABLE 6-A

| | Chrome alum, p.p.b. | | | | | | | | | | | | | | |
|---|---|---|---|---|---|---|---|---|---|---|---|---|---|---|---|
| | 0.00 | | 0.10 | | 0.25 | | 0.50 | | 1.50 | | 3.00 | | 6.00 | | 10.00 | |
| | $F/R^1$ | $A/V^2$ | $F/R^1$ | $A/V^2$ | $F/R^1$ | $A/V^2$ | $F/R^1$ | $A/V^2$ | $F/R^1$ | $A/V^2$ | $F/R^1$ | $A/V^2$ | $F/R^1$ | $A/V^2$ | $F/R^1$ | $A/V^2$ |
| R.p.m.: | | | | | | | | | | | | | | | | |
| 600 | 49 | 24.5 | 28 | 14 | 12 | 6 | 11.5 | 5.75 | 8 | 4 | 8 | 4 | 7 | 3.5 | 7 | 3.5 |
| 300 | 35 | 35 | 18 | 18 | 7 | 7 | 7 | 7 | 5 | 5 | 5 | 5 | 4 | 4 | 4 | 4 |
| 200 | 29 | 43.5 | 15 | 22.5 | 5 | 7.5 | 5 | 7.5 | 3 | 4.5 | 3 | 4.5 | 3 | 4.5 | 3 | 4.5 |
| 100 | 22 | 66 | 10 | 30 | 4 | 12 | 3 | 9 | 2 | 6 | 2 | 6 | 2 | 6 | 2 | 6 |
| 6 | 9 | 441 | 4 | 196 | 1 | 49 | 1 | 49 | 0 | 0 | 0 | 0 | 0 | 0 | 0 | 0 |
| 3 | 8 | 784 | 3 | 294 | 1 | 98 | 1 | 98 | 0 | 0 | 0 | 0 | 0 | 0 | 0 | 0 |
| Initial gel, lb./100 sq. ft | 12 | | 6 | | 2 | | 2 | | 2 | | 2 | | 1 | | 1 | |
| pH | 9.2 | | 9.2 | | 9.0 | | 9.0 | | 9.0 | | 9.0 | | 9.0 | | 9.0 | |

TABLE 6-B

| | Cross-linking agent of the present invention, p.p.b. | | | | | | | | | | | | | | |
|---|---|---|---|---|---|---|---|---|---|---|---|---|---|---|---|
| | 0.0 | | 1.0 | | 2.0 | | 4.0 | | 6.0 | | 8.0 | | 10.0 | |
| | $F/R^1$ | $A/V^2$ | $F/R^1$ | $A/V^2$ | $F/R^1$ | $A/V^2$ | $F/R^1$ | $A/V^2$ | $F/R^1$ | $A/V^2$ | $F/R^1$ | $A/V^2$ | $F/R^1$ | $A/V^2$ |
| R.p.m.: | | | | | | | | | | | | | | |
| 600 | 49 | 24.5 | 52 | 26 | 50 | 25 | 50 | 25 | 55 | 27.5 | 55 | 27.5 | 57 | 28.5 |
| 300 | 35 | 35 | 38 | 38 | 35 | 35 | 35 | 35 | 40 | 40 | 40 | 40 | 42 | 42 |
| 200 | 29 | 43.5 | 31 | 46.5 | 30 | 45 | 30 | 45 | 35 | 52.5 | 35 | 52.5 | 35 | 52.5 |
| 100 | 22 | 66 | 23 | 69 | 22 | 66 | 21 | 63 | 25 | 75 | 25 | 75 | 25 | 75 |
| 6 | 9 | 441 | 8 | 392 | 8 | 392 | 8 | 392 | 11 | 539 | 10 | 490 | 12 | 588 |
| 3 | 8 | 784 | 7 | 686 | 7 | 686 | 7 | 686 | 10 | 980 | 9 | 882 | 11 | 1,078 |
| Initial gel, lb./100 sq. ft | 12 | | 12 | | 12 | | 11 | | 13 | | 10 | | 15 | |
| pH | 9.2 | | 9.0 | | 9.0 | | 9.0 | | 9.0 | | 9.0 | | 9.0 | |

[1] Fann reading, ° fann. [2] Apparent viscosity.

TABLE 7-A

| | Chrome alum, p.p.b. | | | | | | | | | | | | | | |
|---|---|---|---|---|---|---|---|---|---|---|---|---|---|---|---|
| | 0.00 | | 0.10 | | 0.25 | | 0.50 | | 1.50 | | 3.00 | | 6.00 | | 10.00 | |
| | $F/R^1$ | $A/V^2$ | $F/R^1$ | $A/V^2$ | $F/R^1$ | $A/V^2$ | $F/R^1$ | $A/V^2$ | $F/R^1$ | $A/V^2$ | $F/R^1$ | $A/V^2$ | $F/R^1$ | $A/V^2$ | $F/R^1$ | $A/V^2$ |
| R.p.m.: | | | | | | | | | | | | | | | | |
| 600 | 18.5 | 9.25 | 33 | 46.5 | 37 | 18.5 | 17 | 8.5 | 13 | 6.5 | 15 | 7.5 | 18 | 9 | 14 | 7 |
| 300 | 13.5 | 13.5 | 23 | 23 | 25 | 25 | 10 | 10 | 8 | 8 | 10 | 10 | 8 | 8 | 9 | 9 |
| 200 | 11.5 | 17.5 | 18 | 27 | 20 | 30 | 7 | 10.5 | 5 | 7.5 | 7 | 10.5 | 6 | 9 | 7 | 10.5 |
| 100 | 8 | 24 | 14 | 42 | 14 | 42 | 5 | 15 | 3 | 9 | 4 | 12 | 4 | 12 | 5 | 15 |
| 6 | 2 | 98 | 5.5 | 269.5 | 5 | 245 | 1 | 49 | 0 | 0 | 1 | 49 | 1 | 49 | 1 | 49 |
| 3 | 1.5 | 147 | 5.0 | 490 | 4 | 392 | 0 | 0 | 0 | 0 | 0 | 0 | 1 | 98 | 1 | 98 |
| Initial gel, lb./100 sq. ft | 3 | | 14 | | 10 | | 1 | | 0.5 | | 1 | | 2 | | 3 | |
| pH | 9.0 | | 8.3 | | 8.3 | | 8.3 | | 8.3 | | 8.3 | | 8.3 | | 8.3 | |

[1] Fann reading, ° fann. [2] Apparent viscosity.

TABLE 7-B

| | Cross-linking agent of the present invention, p.p.b. | | | | | | | | | | | | | | |
|---|---|---|---|---|---|---|---|---|---|---|---|---|---|---|---|
| | 0 | | 1 | | 2 | | 4 | | 6 | | 8 | | 10 | |
| | $F/R^1$ | $A/V^2$ | $F/R^1$ | $A/V^2$ | $F/R^1$ | $A/V^2$ | $F/R^1$ | $A/V^2$ | $F/R^1$ | $A/V^2$ | $F/R^1$ | $A/V^2$ | $F/R^1$ | $A/V^2$ |
| R.p.m.: | | | | | | | | | | | | | | |
| 600 | 18.5 | 9.25 | 33 | 16.2 | 48 | 24 | 47 | 23.5 | 34 | 17 | 57 | 28.5 | 60 | 04 |
| 300 | 13.5 | 13.5 | 22 | 22 | 33 | 33 | 32 | 32 | 23 | 23 | 37 | 37 | 40 | 55 |
| 200 | 11.5 | 17.25 | 18 | 27 | 26 | 39 | 25 | 37.5 | 16 | 24 | 29 | 43.5 | 30 | 57 |
| 100 | 8 | 24 | 12 | 36 | 18 | 54 | 17 | 51 | 8 | 24 | 18 | 54 | 19 | 30 |
| 6 | 2 | 98 | 3 | 147 | 5.5 | 269.5 | 4 | 196 | 2.5 | 122.5 | 4 | 196 | 5 | 244 |
| 3 | 1.5 | 147 | 2 | 196 | 5 | 490 | 3 | 294 | 2 | 196 | 3 | 294 | 4.5 | 441 |
| Initial gel, lb./100 sq. ft | 3 | | 3 | | 11 | | 8 | | 5 | | 8 | | 8 | |
| pH | 9.0 | | 8.5 | | 8.4 | | 8.2 | | 8.2 | | 8.3 | | 8.3 | |

[1] Fann reading, ° fann. [2] Apparent viscosity, centipoises.

EXAMPLE VIII

Additional tests were conducted and results evaluated to determine the elimination of the metal ion overtreatment factor so often occurring when utilizing prior and less effective cross-linking agents for macromolecular polysaccharide materials. It was found that ratios of applicants' cross-linking agent to macromolecular polysaccharide material as high as 24-to-1 still provided thickening characteristics and showed no indication of chromium ion overtreatment effects. The tests were conducted in both calcium-contaminated Houston, Tex. tap water, i.e., hard water, and synthetic seawater. The hard water was prepared for the samples by placing 100 p.p.m. calcium as calcium sulfate in 350 ml. deionized water. The synthetic seawater was prepared by adding to 350 ml. deionized water 400 p.p.m. calcium as calcium sulfate and 30,000 p.p.m. chloride as sodium chloride.

Samples containing 100 p.p.m. hard water and synthetic seawater, respectively, were treated with 0.50 and 0.75 p.p.b. of the macromolecular polysaccharide material and were then blended by mechanical agitation. The samples were then treated with 2, 6, and 12 p.p.b., respectively, of the cross-linking agent made as in Example I, and were again mechanically agitated. The pH of each sample was adjusted to 9.0. The samples were cooled to room temperature before determining rheological properties using the Fann Viscometer as described earlier. Fann Viscometer tests taken at room temperature were also conducted on portions of the samples after "aging" for 16 hours at 150° F., in order to determine the effect of higher temperatures on rheological properties. All tests resulted in no chromium ion overtreatment characteristics. Each sample showed thickening at increased p.p.b. levels. In addition, excellent shear thinning properties were also obtained. Increased temperatures did not affect shear thinning characteristics.

TABLE 8-A.—TESTS IN HARD WATER BEFORE AGING

| | Polysaccharide, p.p.b. | | | | | |
|---|---|---|---|---|---|---|
| | 0.50 | 0.50 | 0.50 | 0.75 | 0.75 | 0.75 |
| | Applicants' cross-linking agent, p.p.b. | | | | | |
| | 2 | 6 | 12 | 2 | 6 | 12 |
| | °Fann / Apparent viscosity | °Fann / Apparent viscosity | °Fann / Apparent viscosity | °Fann / Apparent viscosity | °Fann / Apparent viscosity | °Fann / Apparent viscosity |
| R.p.m.: | | | | | | |
| 600 | 18 / 9 | 19 / 9.5 | 30 / 15 | 29 / 14.5 | 31.5 / 15.5 | 36 / 18 |
| 300 | 12 / 12 | 13 / 13 | 20 / 20 | 20 / 20 | 32 / 22 | 25 / 25 |
| 200 | 10 / 15 | 11 / 16.5 | 17 / 25.5 | 17 / 25.5 | 18 / 27 | 21 / 31.5 |
| 100 | 7 / 31 | 8 / 24 | 12 / 36 | 13 / 39 | 14 / 42 | 16 / 48 |
| 6 | 3 / 147 | 4 / 196 | 5 / 245 | 6 / 294 | 6 / 294 | 21 / 1,029 |
| 3 | 2.5 / 245 | 3 / 294 | 4 / 392 | 6 / 588 | 5 / 490 | 16 / 1,568 |
| Initial gel, lb./100 sq.ft. | 9 | 8 | 8 | 12 | 10 | 12 |
| pH | 9.0 | 9.0 | 9.0 | 9.0 | 9.0 | 9.0 |

TABLE 8-B.—TESTS IN HARD WATER AFTER AGING

| | Polysaccharide, p.p.b. | | | | | |
|---|---|---|---|---|---|---|
| | 0.50 | 0.50 | 0.50 | 0.75 | 0.75 | 0.75 |
| | Applicants' cross-linking agent, p.p.b. | | | | | |
| | 2 | 6 | 12 | 2 | 6 | 12 |
| | °Fann / Apparent viscosity | °Fann / Apparent viscosity | °Fann / Apparent viscosity | °Fann / Apparent viscosity | °Fann / Apparent viscosity | °Fann / Apparent viscosity |
| R.p.m.: | | | | | | |
| 600 | 14 / 7 | 21 / 10.5 | 29 / 14.5 | 25.5 / 12.75 | 31 / 15.5 | 40 / 20 |
| 300 | 9.5 / 9.5 | 14.5 / 14.5 | 17 / 17 | 18 / 18 | 21 / 21 | 28 / 28 |
| 200 | 7.5 / 11.25 | 12 / 18 | 14 / 21 | 15 / 22.5 | 17 / 25.5 | 22.5 / 33.75 |
| 100 | 5 / 15 | 8 / 24 | 9.5 / 28.5 | 10.5 / 31.5 | 11.5 / 34.5 | 16 / 48 |
| 6 | 1 / 49 | 2.5 / 122.5 | 3 / 147 | 3.5 / 171.5 | 3.5 / 171.5 | 6.5 / 318.5 |
| 3 | 1 / 98 | 2 / 196 | 2.5 / 245 | 2.5 / 248 | 3 / 294 | 5 / 490 |
| Initial gel, lb./100 sq. ft. | 1.5 | 3 | 3.5 | 4 | 4 | 6 |
| pH | 7.8 | 8.0 | 8.1 | 7.8 | 8.0 | 8.0 |

TABLE 8-C.—TESTS IN SYNTHETIC SEAWATER BEFORE AGING

| | Polysaccharide, p.p.b. | | | | | |
|---|---|---|---|---|---|---|
| | 0.50 | 0.50 | 0.50 | 0.75 | 0.75 | 0.75 |
| | Applicants' cross-linking agent, p.p.b. | | | | | |
| | 2 | 6 | 12 | 2 | 6 | 12 |
| | °Fann / Apparent viscosity | °Fann / Apparent viscosity | °Fann / Apparent viscosity | °Fann / Apparent viscosity | °Fann / Apparent viscosity | °Fann / Apparent viscosity |
| R.p.m.: | | | | | | |
| 600 | 19 / 9.5 | 16 / 8 | 21 / 10.5 | 24.5 / 12.25 | 30.5 / 15.25 | 35 / 17.5 |
| 300 | 13 / 12 | 11 / 11 | 13.5 / 13.5 | 17 / 17 | 20 / 20 | 24 / 24 |
| 200 | 11 / 16.5 | 8.5 / 12.5 | 11 / 16.5 | 14 / 21 | 15.5 / 23.25 | 19 / 28.5 |
| 100 | 8 / 24 | 6 / 18 | 8 / 24 | 10.5 / 31.5 | 11.5 / 34.5 | 14 / 42 |
| 6 | 3 / 147 | 2 / 98 | 3 / 147 | 4.5 / 220.5 | 5 / 220.5 | 6 / 294 |
| 3 | 2.5 / 245 | 1.5 / 73.5 | 2.5 / 245 | 4 / 392 | 4.5 / 882 | 5 / 490 |
| Initial gel, lb./100 sq. ft. | 5 | 4 | 3 | 8 | 9 | 7 |
| pH | 9.1 | 9.1 | 9.0 | 9.0 | 9.0 | 9.0 |

TABLE 8-D.—TESTS IN SYNTHETIC SEAWATER AFTER AGING

| | Polysaccharide, p.p.b. | | | | | |
|---|---|---|---|---|---|---|
| | 0.50 | 0.50 | 0.50 | 0.75 | 0.75 | 0.75 |
| | Applicants' cross-linking agent, p.p.b. | | | | | |
| | 2 | 6 | 12 | 2 | 6 | 12 |
| | °Fann / Apparent viscosity | °Fann / Apparent viscosity | °Fann / Apparent viscosity | °Fann / Apparent viscosity | °Fann / Apparent viscosity | °Fann / Apparent viscosity |
| R.p.m.: | | | | | | |
| 600 | 16 / 8 | 15 / 7.5 | 18 / 9 | 23 / 11.5 | 26 / 13 | 28 / 14 |
| 300 | 10.5 / 10.5 | 9 / 9 | 11 / 11 | 16 / 16 | 16 / 16 | 18 / 18 |
| 200 | 8 / 12 | 6 / 9 | 8 / 12 | 13 / 19.5 | 12 / 18 | 13 / 19.5 |
| 100 | 5.5 / 16.5 | 4 / 12 | 5 / 15 | 9 / 27 | 8 / 24 | 9 / 27 |
| 6 | 1.5 / 73.5 | 1 / 49 | 2 / 98 | 3 / 147 | 2.5 / 122.5 | 3 / 147 |
| 3 | 1.5 / 147 | 1 / 98 | 1.5 / 147 | 2 / 196 | 2 / 196 | 2.5 / 245 |
| Initial gel, lb./100 sq. ft | 2 | 1 | 2 | 4.5 | 5 | 3 |
| pH | 7.9 | 8.1 | 8.1 | 7.9 | 8.0 | 8.0 |

EXAMPLE IX

An oil well was drilled in Reeves County, Tex., utilizing an aqueous drilling fluid containing the macromolecular polysaccharide material cross-linked with the cross-linking agent of the present invention made as in Example I. A water-base system was utilized in the well until a depth of about 11,500 feet had been reached. This system was then pumped out of the well and the drilling fluid containing the cross-linked macromolecular polysaccharide material was thereafter circulated during further drilling. The drilling fluid consisted of the following materials which were blended in barrels of brine water.

| | P.p.b. |
|---|---|
| Macromolecular polysaccharide material | .975 |
| Cross-linking agent | 3.8 |
| Sodium hydroxide | .375 |
| Biodegradation preventative | .1 |

Contrary to the conventional practice of drilling with clayey suspensions, no bentonites or clays of any kind were used to compose or treat the circulating fluid at any time prior to or during the course of drilling.

The polysaccharide material was added at the rate of ten minutes per sack, while the cross-linking agent was added at the rate of 16 sacks per 20 minutes. Sodium hydroxide was added every 30 minutes to adjust the pH to 8.0. The total mixing time was a little over two hours.

Samples of this drilling fluid were taken at various drilling depths from the flow line and the mud pit and were tested as in previous examples for shear thinning characteristics. It was found that the drilling fluid showed excellent rheological properties for maximum penetration rate, as shown in the following table.

TABLE 9

| | Depths | | | | | | | | | | | |
|---|---|---|---|---|---|---|---|---|---|---|---|---|
| | 11,490 ft. | | 11,960 ft. | | 12,923 ft. | | 13,357 ft. | | 13,928 ft. | | 14,974 ft. | |
| | F/R [1] | A/V [2] | F/R [1] | A/V [2] | F/R [1] | A/V [2] | F/R [1] | A/V [2] | F/R [1] | A/V [2] | F/R [1] | A/V [2] |
| R.p.m.: | | | | | | | | | | | | |
| 600 | 26 | 13 | 44 | 22 | 45 | 22.5 | 35 | 17.5 | 38 | 19 | 56 | 28 |
| 300 | 19 | 19 | 32 | 32 | 31 | 31 | 22 | 22 | 28 | 28 | 39 | 39 |
| 200 | 16 | 24 | 26 | 39 | 25 | 37.5 | 17 | 25.5 | 23 | 34.5 | 33 | 49.5 |
| 100 | 12 | 36 | 19 | 57 | 17 | 51 | 11 | 33 | 18 | 54 | 26 | 78 |
| 6 | 4 | 196 | 5 | 256 | 5 | 256 | 4 | 196 | 9 | 441 | 13 | 637 |
| 3 | 3 | 294 | 3 | 294 | 5 | 490 | 3 | 294 | 9 | 882 | 9 | 882 |

[1] Fann reading, °Fann.  [2] Apparent viscosity, centipoises.

The ratio of cross-linking agent to macromolecular polysaccharide material can vary considerably depending on the selected industrial use and the particular environments and circumstances surrounding such use without encountering any metal ion overtreatment effect. For example, when using the cross-linked material of this invention in aqueous drilling fluids, formation characteristics, bore hole properties, drilling depth, contaminants, temperatures and pressures encountered, and drilling fluid weight will influence the determination of quantities of cross-linking agent and macro-molecular polysaccharide material to be utilized in order to achieve the desired effect. Because of this it is impossible to specifically state nominal ratios under all environments. Those skilled in the art of drilling will be able to easily determine needed ratios by testing samples obtained from the bore hole, checking formation characteristics, and by otherwise determining the rheological and other properties that will be required. Nevertheless, it can be stated that, under most drilling conditions, in order to obtain satisfactory shear thinning drilling fluid properties resulting from cross-linking the macromolecular polysaccharide material with the cross-linking agent of the present invention, a 4-to-1 cross-linking agent-to-polysaccharide ratio can be effectively utilized. When utilized in aqueous drilling fluids, our cross-linking agent has been found readily adaptable to all drilling environments, being effective in fresh water, salt solutions, and in brines, at cross-linking agent-to-polysaccharide ratios as low as 1-to-1 and as high as 24-to-1.

It is important to note that, while cross-linking agents utilized in the prior art are sometimes able to produce cross-linked polysaccharide solutions having satisfactory rheological characteristics at p.p.b. levels which are somewhat lower than those suggested when using the cross-linking agent of the present invention, those characteristics are extremely difficult to control. A minor miscalculation in p.p.b. concentration for these prior art cross-linking materials will often result in drastic metal ion overtreatment effects which, in turn, drastically affect rheological characteristics. It is often desirable to utilize increased p.p.b. levels of a cross-linking agent for reasons which are secondary to rheology. For example, when utilizing a cross-linking agent in drilling fluids, the material may also serve the office of bore hole stabilizer and filtration control agent. Under many drilling environments these functions cannot be effectively accomplished at p.p.b. levels of .5 to 1.0. Thus, although satisfactory, though uncontrolled, rhetology may be achieved utilizing prior art cross-linking agents at these low p.p.b. levels, other drilling fluid functions cannot be achieved. The discovery of the cross-linking agent of the present invention enables controlled rheology at increased p.p.b. levels, permitting sufficient material to be added for bore hole stabilization, etc.

Although the invention has been described in terms of specific embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What we claim is:

1. The product of the process comprising the steps of:
   (A) Dissolving an aqueous solution a bacterially modified carbohydrate produced by the action of bacteria of the genus Xanthomonas on a carbohydrate selected from the class consisting of exudate gums, seaweed gums, seed gums, starch, cellulose and glucose;
   (B) Adding to said solution a chelate cross-linking agent consisting essentially of (1) a bark extract and (2) chrome sulfate of one-third basicity or less, the ratio of said cross-linking agent to said modified carbohydrate being from about 1-to-1 to about 24-to-1 the chromium content of the said cross-linking agent being from between about 4% by weight to about 10% by weight;
   (C) Adjusting the pH of the aqueous solution to between about 6 to about 7 to initiate cross-linking of the modified carbohydrate;
   (D) Stirring the aqueous solution to prevent high pH localization; and
   (E) Readjusting the pH of the aqueous solution up to about 11.0 to complete cross-linking of the modified carbohydrate.

2. The product of claim 1 wherein the said bacterially modified carbohydrate is produced by the action of the bacteria *Xanthomonas campestris*, on said carbohydrate.

3. The product of claim 1 wherein the ratio of the cross-linking agent to the modified carbohydrate is about 4-to-1.

4. The product of claim 1 wherein the carbohydrate is glucose.

No references cited.

LEWIS GOTTS, Primary Examiner

D. R. PHILLIPS, Assistant Examiner

UNITED STATES PATENT OFFICE
CERTIFICATE OF CORRECTION

Patent No. 3,753,971  Dated August 21, 1973

Inventor(s) William C. Browning and Billy G. Chesser

It is certified that error appears in the above-identified patent and that said Letters Patent are hereby corrected as shown below:

Change the name of the co-inventor from "Billy G. Chester" to --Billy G. Chesser--.

Signed and sealed this 14th day of May 1974.

(SEAL)
Attest:

EDWARD M. FLETCHER, JR.
Attesting Officer

C. MARSHALL DANN
Commissioner of Patents